(12) United States Patent
Kim

(10) Patent No.: US 12,504,040 B2
(45) Date of Patent: Dec. 23, 2025

(54) JOURNAL FOIL AIR BEARING PREVENTING SEPARATION OF BUMP FOIL

(71) Applicant: TNE KOREA CO., LTD., Cheongju-si (KR)

(72) Inventor: Kyeong Su Kim, Daejeon (KR)

( * ) Notice: Subject to any disclaimer, the term of this patent is extended or adjusted under 35 U.S.C. 154(b) by 132 days.

(21) Appl. No.: 18/568,657

(22) PCT Filed: Jun. 16, 2022

(86) PCT No.: PCT/KR2022/008567
§ 371 (c)(1),
(2) Date: Dec. 8, 2023

(87) PCT Pub. No.: WO2022/265438
PCT Pub. Date: Dec. 22, 2022

(65) Prior Publication Data
US 2024/0288033 A1    Aug. 29, 2024

(30) Foreign Application Priority Data

Jun. 17, 2021    (KR) .................. 10-2021-0078935

(51) Int. Cl.
*F16C 17/02*    (2006.01)
(52) U.S. Cl.
CPC .................... *F16C 17/024* (2013.01)
(58) Field of Classification Search
CPC .................................................... F16C 17/024
See application file for complete search history.

(56) References Cited

U.S. PATENT DOCUMENTS

| | | | |
|---|---|---|---|
| 8,414,191 B2 * | 4/2013 | Flora | F16C 17/024 384/106 |
| 10,215,224 B1 * | 2/2019 | Lee | F16C 17/024 |
| 11,306,726 B2 * | 4/2022 | Perevozchikov | F16C 17/024 |
| 11,319,987 B2 * | 5/2022 | Omori | F16C 17/024 |
| 11,940,005 B2 * | 3/2024 | Omori | F16C 17/024 |

FOREIGN PATENT DOCUMENTS

| | | | | |
|---|---|---|---|---|
| CN | 110594285 A | | 12/2019 | |
| JP | 2004011839 A | * | 1/2004 | F16C 43/02 |
| JP | 2012-013218 A | | 1/2012 | |
| KR | 10-1558490 B1 | | 10/2015 | |
| KR | 10-2019-0021540 A | | 3/2019 | |

* cited by examiner

*Primary Examiner* — James Pilkington
(74) *Attorney, Agent, or Firm* — KORUS Patent, LLC; Seong Il Jeong

(57) ABSTRACT

A journal foil air bearing supports a load along the radial direction of a rotating shaft. The bearing includes a top foil, a bump foil, and a base foil. The top foil faces the shaft, while the bump foil acts as an elastic member surrounding the top foil. The base foil, a circular pipe member, houses the bump foil. A separation preventer, protruding from the base foil without touching the shaft, restrains the bump foil from moving along the shaft's longitudinal direction. This design prevents the bump foil from escaping during operation, which maintains bearing performance and mitigates secondary damage from contact with other components.

4 Claims, 17 Drawing Sheets

Prior Art

JOURNAL FOIL AIR BEARING PREVENTING SEPARATION OF BUMP FOIL

TECHNICAL FIELD

The present invention relates to a journal foil air bearing, and more particularly, to a journal foil air bearing capable of preventing performance degradation and damage of the bearing by preventing a bump foil from escaping in a longitudinal direction of a rotating shaft during operation.

BACKGROUND ART

Air bearings are bearings for supporting a load by floating a rotating shaft with the pressure of air compressed between the rotating shaft and the bearing.

The air bearings use a principle that, when a viscous gas such as air is compressed by meeting a stationary surface while moving along with a moving surface, the air trapped between the moving surface and the stationary surface is increased in pressure to lift the moving surface.

The air bearings include thrust air bearings for supporting a load applied along a longitudinal direction of the rotating shaft, and journal air bearings for supporting a load applied along a radial direction of the rotating shaft.

Examples of the journal air bearings include journal foil air bearings which use thin foil to improve pressure formation and increase dynamic stability at high speed.

FIG. 17 shows an example of a journal foil air bearing 1. The journal foil air bearing 1 includes a top foil 2 disposed to face an outer circumferential surface of a rotating shaft F rotating in a preset rotation direction W, and surrounding the rotating shaft F, and a bump foil 3 provided as an elastically deformable wave-shaped member and disposed to surround the top foil 2, and ends of the top foil 2 and the bump foil 3 are welded to welded portions 4 on an inner surface of a bearing housing S.

However, according to the existing journal foil air bearing 1, although the size of the bearing housing S may be easily managed due to a small number of components, the mounting or removing of the bearing in or from the bearing housing S may be very inconvenient, and the storage and management of the components 2 and 3 of the bearing at a work site may be very difficult.

Furthermore, according to the existing journal foil air bearing 1, because the bump foil 3 is directly mounted on an inner circumferential surface of the bearing housing S, which needs to have a certain shape or size and a certain roughness and thus additionally requires a special process such as grinding or coating, a total product cost may be increased.

Meanwhile, according to the existing journal foil air bearing 1, the top foil 2 and the bump foil 3 are fixed to the inner surface of the bearing housing S by using welding or various methods other than welding, e.g., keys, bolts, or pins, may also be used for the fixing. However, the above methods may have problems such as technical uncertainty, difficulty in assembly/disassembly, and increase in product cost.

To solve the above-described problems, Korean Patent Registration No. 10-1558490 (registered on Oct. 1, 2015) discloses a journal foil air bearing capable of being mounted after a base foil, a bump foil, and a top foil are coupled and modularized into a single piece by using a coupling means.

However, according to the existing journal foil air bearing 1 and the journal foil air bearing of Korean Patent Registration No. 10-1558490, due to frequent starting/stopping, external vibration and impact, etc., a non-fixed end (i.e., a free end) of the top foil or the bump foil may escape in a direction of the rotating shaft during operation. In this case, not only the performance of the bearing may degrade but also the escaped bump foil and top foil may be abraded in contact with other components to cause serious secondary damage.

To solve these problems, after the bearing is assembled, circular loop-shaped separation prevention rings may be assembled to sides of the bearing to prevent the non-fixed end (i.e., the free end) of the top foil or the bump foil from escaping in the direction of the rotating shaft. However, the above method may increase a total assembly time.

In addition, when the existing separation prevention rings are used, in order to prevent physical contact between inner circumferential surfaces of the separation prevention rings and the rotating shaft, a sufficient distance between the inner circumferential surfaces of the separation prevention rings and the rotating shaft needs to be ensured. As such, although the effect of preventing the separation of the bump foil may be secured to some extent, the separation of the top foil disposed very close to the surface of the rotating shaft may not be prevented.

DETAILED DESCRIPTION OF THE INVENTION

Technical Problem

The present invention provides a journal foil air bearing with a structure improved to prevent performance degradation and damage of the bearing by preventing a bump foil from escaping in a longitudinal direction of a rotating shaft during operation.

Technical Solution

According to an aspect of the present invention, there is provided a journal foil air bearing for supporting a load applied along a radial direction of a rotating shaft rotating about a centerline, the journal foil air bearing including a top foil disposed to face an outer circumferential surface of the rotating shaft and surround the rotating shaft, a bump foil provided as an elastically deformable member and disposed to surround the top foil, a base foil disposed to surround the bump foil, provided as a circular pipe member extending a preset length along the centerline, and including a hollow having the centerline as a center of circle, and at least one separation preventer provided on the base foil to restrain the bump foil accommodated in the hollow of the base foil, from being separated along a longitudinal direction of the rotating shaft, wherein the separation preventer protrudes a preset length toward the rotating shaft in such a manner that a distal end of the separation preventer is not in contact with a surface of the rotating shaft.

The distal end of the separation preventer may be provided in a circular shape having the centerline as a center of circle.

The base foil may be formed as a pipe with a "C"-shaped cross-section by rolling a rectangular pressed metal plate around the centerline, and the separation preventer may be formed by bending a protrusion pressed in a preset shape and protruding from the metal plate.

The separation preventer may be provided at each of both ends of the hollow of the base foil.

A plurality of separation preventers may be provided and spaced apart from each other by a preset distance along a circumferential direction of the base foil.

The separation preventer may protrude a preset length toward the rotating shaft and may not protrude beyond a surface of the top foil facing the outer circumferential surface of the rotating shaft.

The journal foil air bearing may further include a coupling means for coupling an end of the top foil, an end of the bump foil, an end of the base foil, and another end of the base foil to each other.

At least one of the top foil, the bump foil, and the base foil may have a shape which is mass-producible through pressing.

Advantageous Effects

According to the present invention, a journal foil air bearing for supporting a load applied along a radial direction of a rotating shaft rotating about a centerline includes a top foil disposed to face an outer circumferential surface of the rotating shaft and surround the rotating shaft, a bump foil provided as an elastically deformable member and disposed to surround the top foil, a base foil disposed to surround the bump foil, provided as a circular pipe member extending a preset length along the centerline, and including a hollow having the centerline as a center of circle, and at least one separation preventer provided on the base foil to restrain the bump foil accommodated in the hollow of the base foil, from being separated along a longitudinal direction of the rotating shaft, wherein the separation preventer protrudes a preset length toward the rotating shaft in such a manner that a distal end of the separation preventer is not in contact with a surface of the rotating shaft. As such, because the bump foil does not escape in the longitudinal direction of the rotating shaft during operation, the performance of the bearing may not be reduced and serious secondary damage due to the contact between the escaped bump foil and other components may not be caused.

BEST MODE

Hereinafter, the present invention will be described in detail by explaining embodiments of the invention with reference to the attached drawings.

Figure 1:
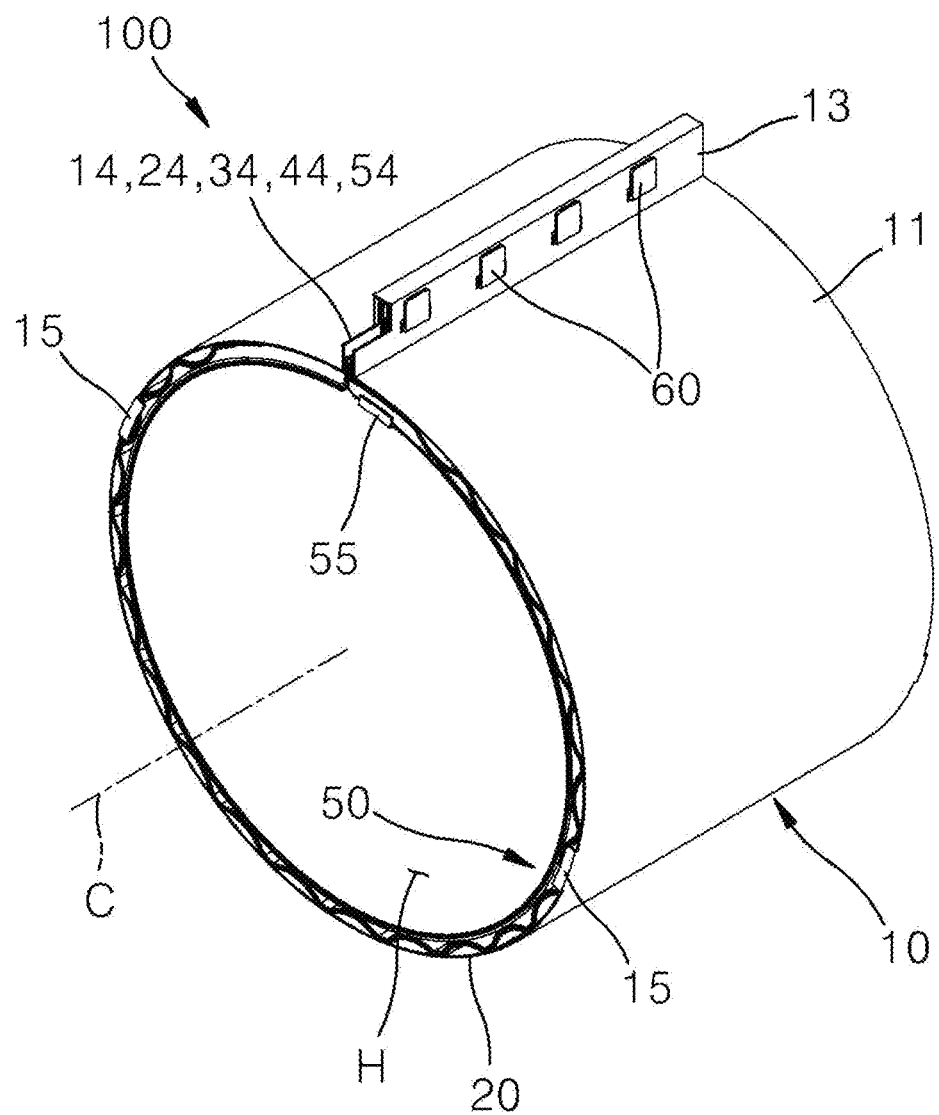
FIG. 1 is a perspective view of a journal foil air bearing according to an embodiment of the present invention.
Figure 2:
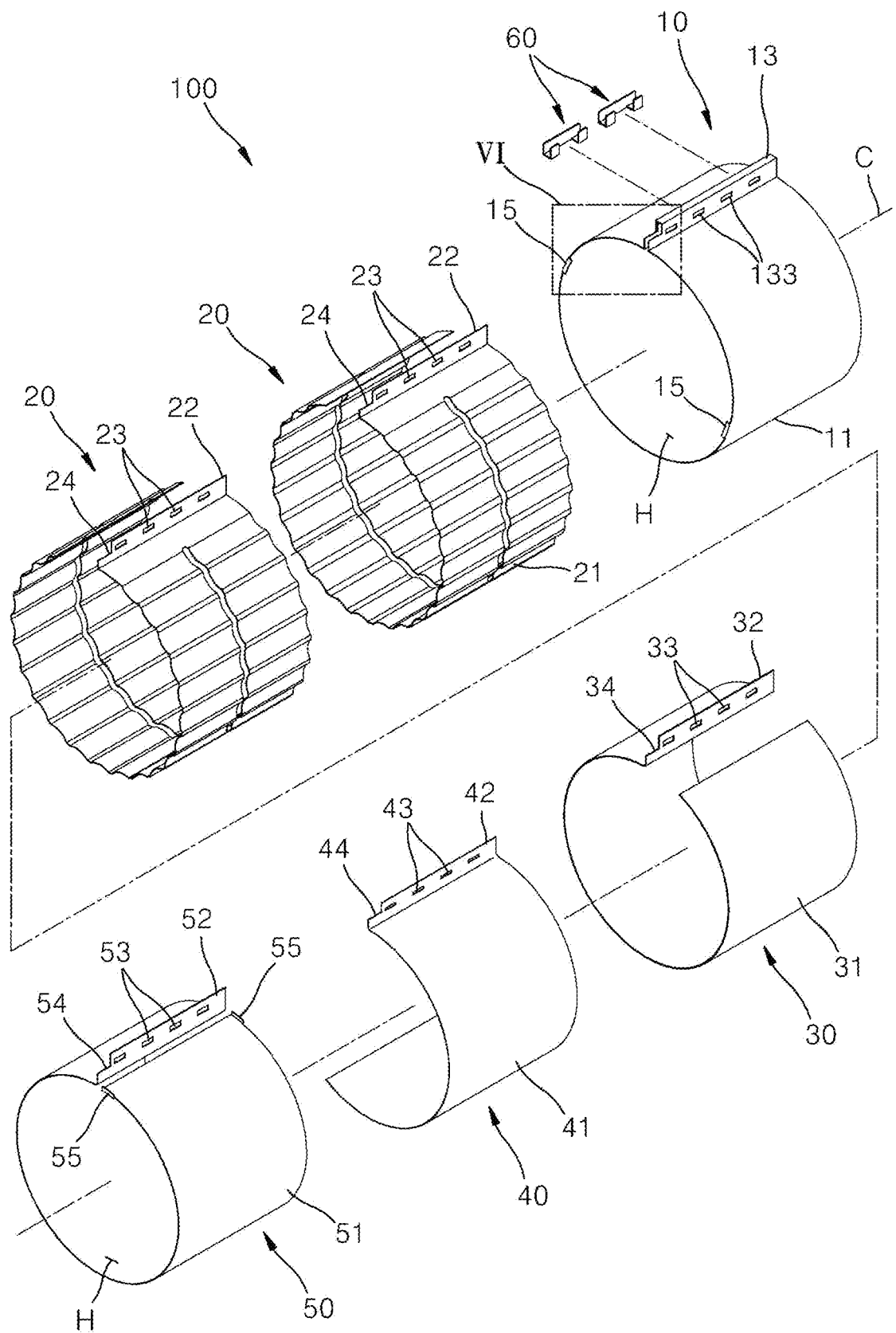
FIG. 2 is an exploded perspective view of the journal foil air bearing illustrated in FIG. 1.

FIG. 1 is a perspective view of a journal foil air bearing according to an embodiment of the present invention; FIG. 2 is an exploded perspective view of the journal foil air bearing illustrated in FIG. 1; and FIG. 3 is a front view of the journal foil air bearing illustrated in FIG. 1.

Figure 3:
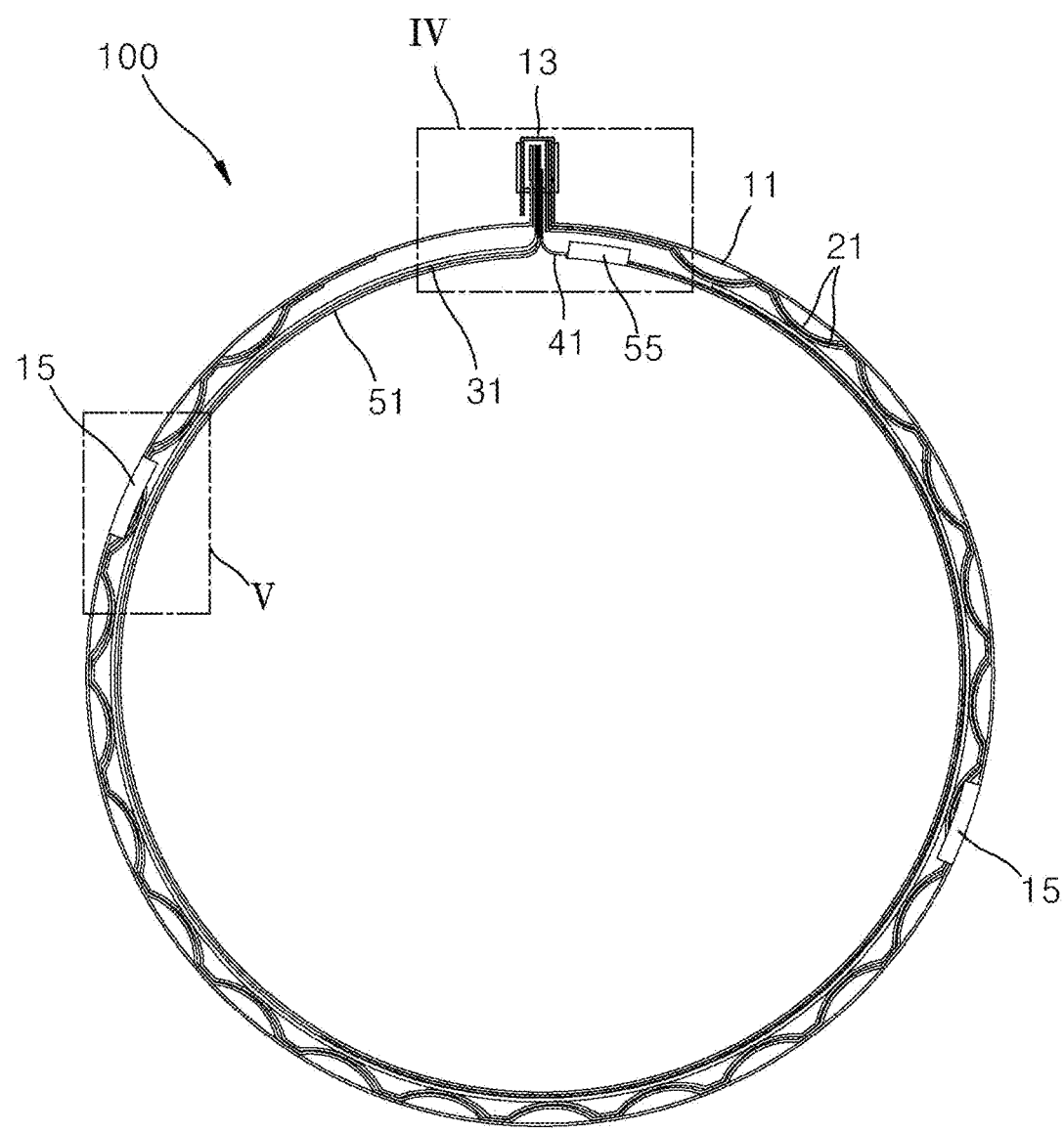
FIG. 3 is a front view of the journal foil air bearing illustrated in FIG. 1.

Referring to FIGS. 1 to 3, a journal foil air bearing 100 according to an embodiment of the present invention is a journal foil air bearing for supporting a load applied along a radial direction of a rotating shaft F rotating about a centerline C, and includes a base foil 10, a bump foil 20, top foils 30, 40, and 50, and a coupling means.

As shown in FIG. 2, the base foil 10 is a circular pipe member produced by pressing a flexible and elastic metal plate, and includes a base foil body 11, an insertion portion 12, an accommodation portion 13, an assembly direction identification recess 14, and a separation preventer 15.

In the current embodiment, the base foil 10 is formed as a pipe with a "C"-shaped cross-section by rolling a rectangular pressed metal plate around the centerline C.

The base foil body 11 is a circular pipe member extending a preset length along the centerline C, and includes a hollow H having the centerline C as a center of circle.

The base foil body 11 is disposed to surround the bump foil 20 described below, such that the bump foil 20 is accommodated in the hollow H of the base foil body 11.

Figure 4:
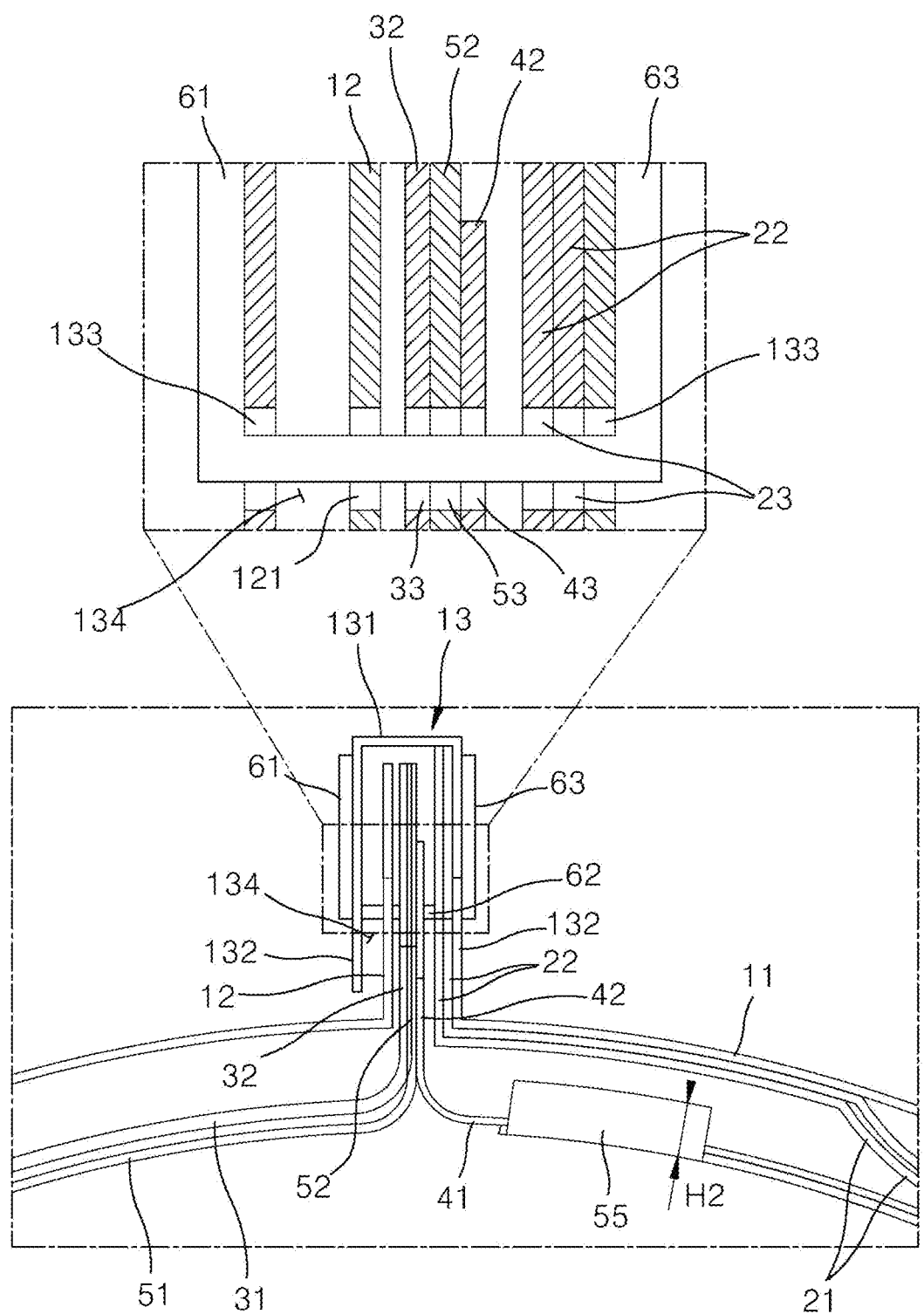
FIG. 4 is an enlarged view of portion "IV" of the journal foil air bearing illustrated in FIG. 3.

As shown in FIG. 4, the insertion portion 12 is a portion provided at a left end of the base foil body 11 and, in the current embodiment, the left end of the base foil body 11 is bent in an "L" shape and protrudes upward so as to be accommodated in the accommodation portion 13 described below.

As shown in FIG. 4, coupling holes 121 provided as four holes spaced apart from each other by a preset distance along the centerline C are formed in the insertion portion 12.

As shown in FIG. 2, the accommodation portion 13 is a portion provided at a right end of the base foil body 11, and includes a horizontal portion 131, vertical portions 132, coupling holes 133, and an accommodation space 134.

As shown in FIG. 4, the horizontal portion 131 is a top horizontal rectangular portion of the right end of the base foil body 11 which is bent in a "⌐" shape.

As shown in FIG. 4, the vertical portions 132 are a pair of portions extending vertically downward from both ends of the horizontal portion 131 and spaced apart from each other by a preset distance.

As shown in FIG. 2, the coupling holes 133 are four holes formed in each of the pair of vertical portions 132, and are spaced apart from each other by a preset distance along the centerline C.

The coupling holes 133 are formed at positions corresponding to the coupling holes 121 formed in the insertion portion 12.

As shown in FIG. 4, the accommodation space 134 is a space formed under the right end of the base foil body 11 which is bent in a "∩" shape, and has a bottom which is open toward the centerline C.

The accommodation space 134 is a space for accommodating insertion portions 32, 42, and 52 of the top foils 30, 40, and 50, an insertion portion 22 of the bump foil 20, and the insertion portion 12 of the base foil 10.

Figure 16:
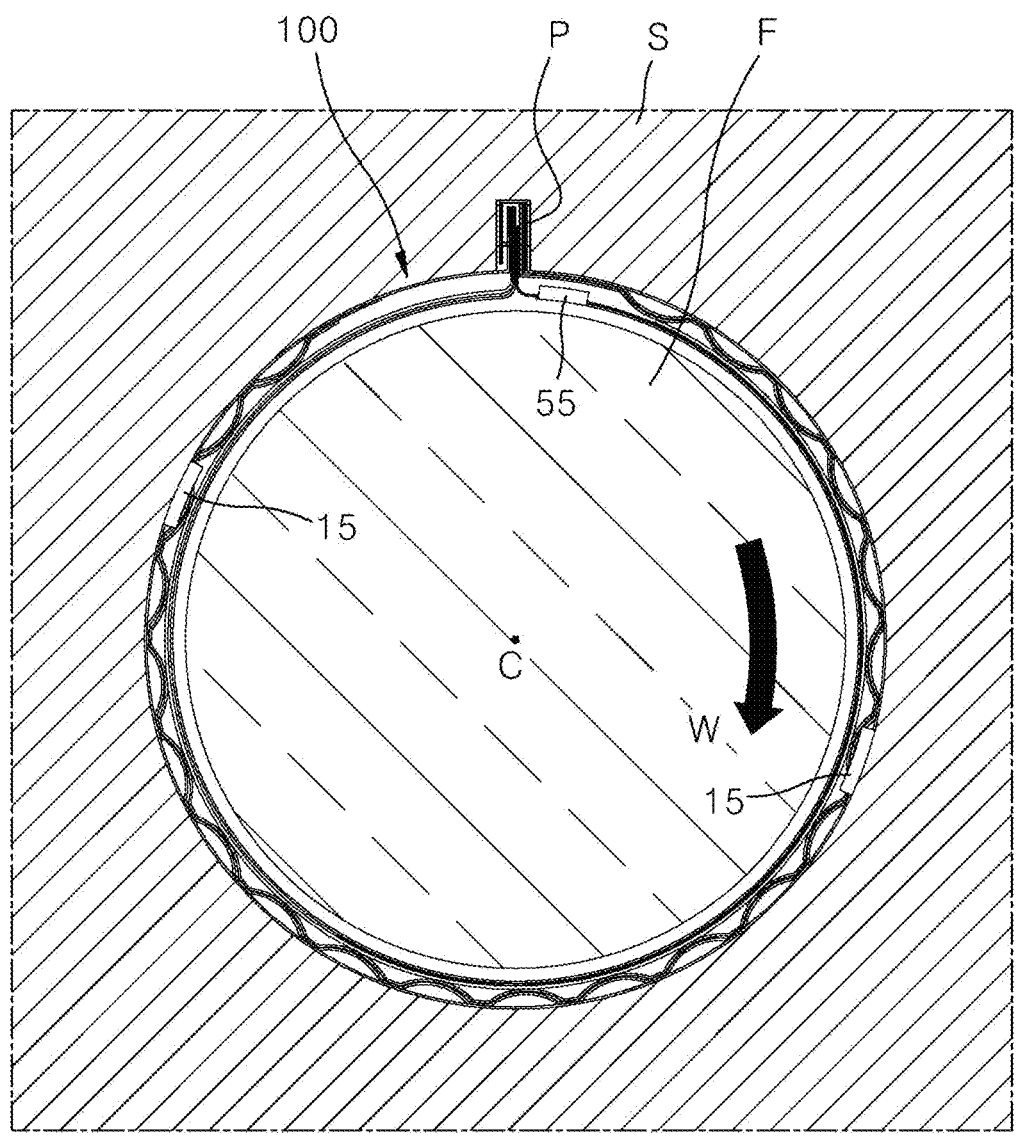
FIG. 16 is a view showing a state in which the journal foil air bearing illustrated in FIG. 1 is mounted and used in a bearing housing.

In the current embodiment, as shown in FIG. 16, the accommodation portion 13 protrudes in a radial direction from an outer circumferential surface of the base foil body 11 so as to be inserted into a housing groove P formed in an inner circumferential surface of a bearing housing S.

As shown in FIG. 1, the assembly direction identification recess 14 is an "L"-shaped recess formed at a front end of the base foil 10 to prevent a user's mistake when assembling or mounting the bearing.

The separation preventer 15 is a stopper for restraining the bump foil 20 accommodated in the hollow H of the base foil 10, from being separated along a longitudinal direction C of the rotating shaft F, and is provided on at least one of both ends of the hollow H of the base foil 10.

In the current embodiment, as shown in FIG. 2, two separation preventers 15 are provided at one end of the hollow H of the base foil 10, and another two separation preventers 15 are provided at the other end of the hollow H of the base foil 10.

Herein, the two separation preventers 15 at the end of the hollow H of the base foil 10 are spaced apart from each other by 180° along a circumferential direction of the base foil 10.

In the current embodiment, the separation preventers 15 provided at the end of the hollow H of the base foil 10 are positioned to face the separation preventers 15 provided at the other end of the hollow H of the base foil 10.

Herein, a distance in the longitudinal direction C between a pair of separation preventers 15 facing each other has the same value as a width of the bump foil 20 within a preset tolerance.

Figure 5:
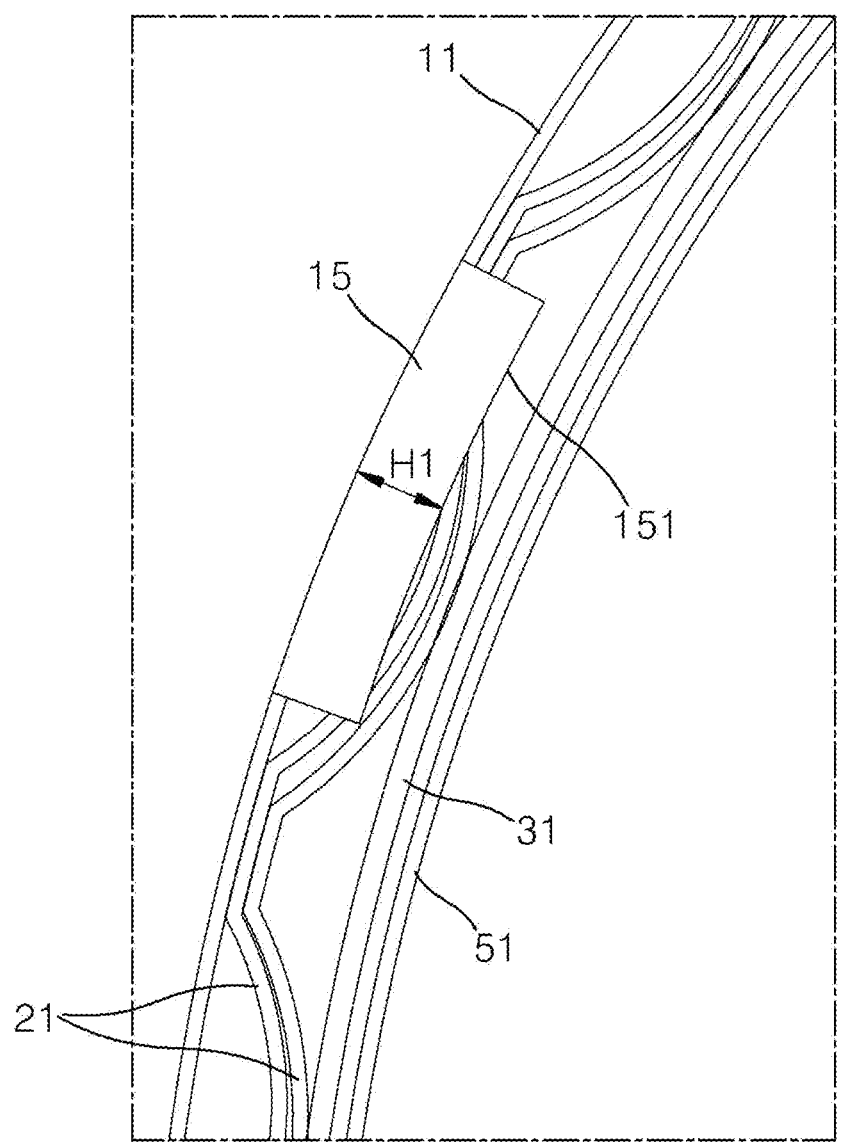
FIG. 5 is an enlarged view of portion "V" of the journal foil air bearing illustrated in FIG. 3.
Figure 6:
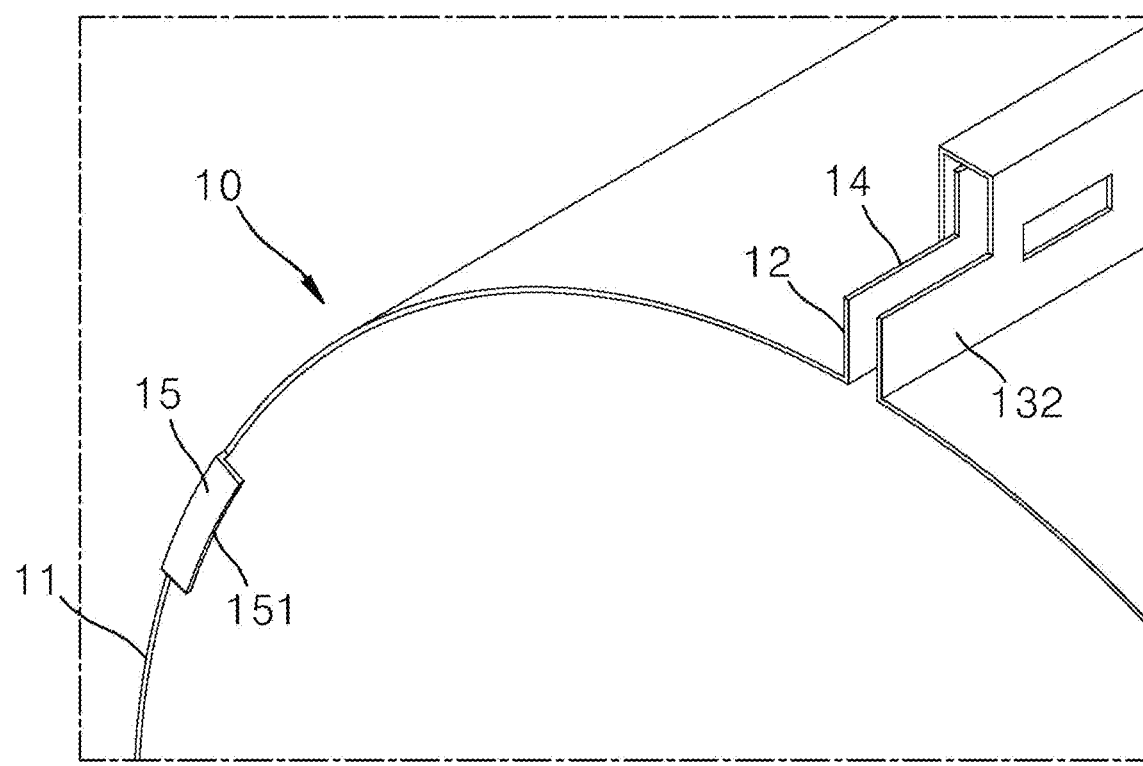
FIG. 6 is a partially enlarged view of a base foil illustrated in FIG. 2.
Figure 7:
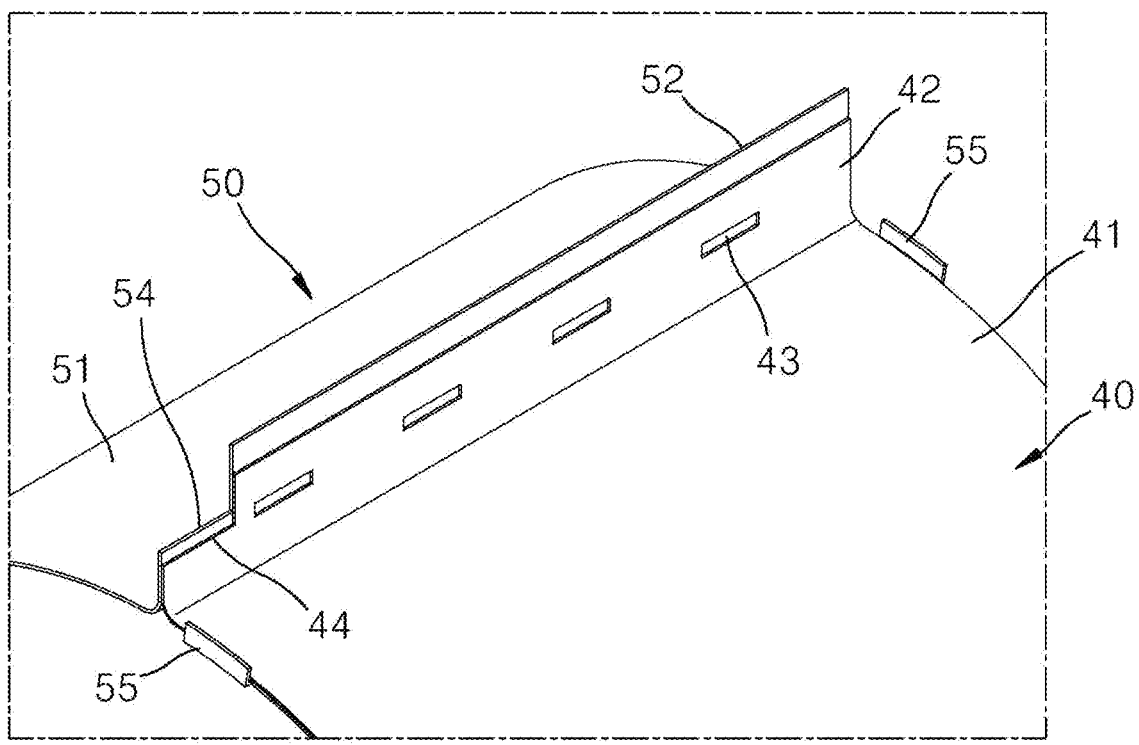
FIG. 7 is a view showing a state in which a second top foil and first top foil illustrated in FIG. 2 are coupled to each other.
Figure 8:
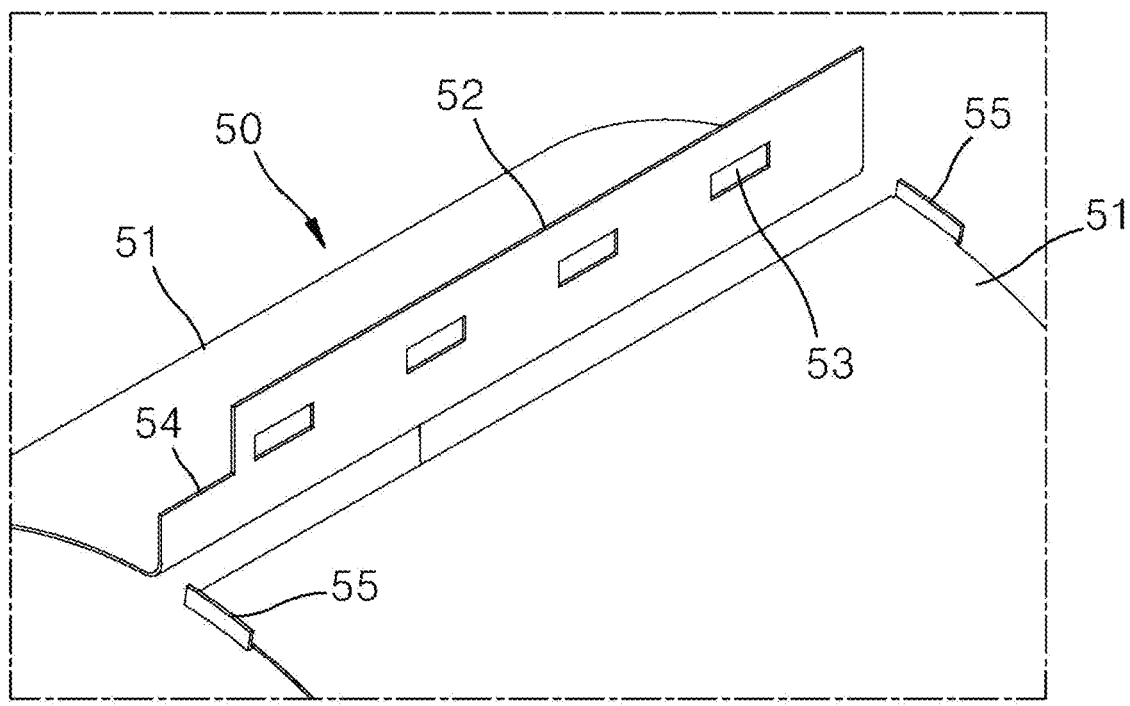
FIG. 8 is a partially enlarged view of the first top foil illustrated in FIG. 2.

As shown in FIG. 5, the separation preventer 15 protrudes a preset length H1 toward the rotating shaft F in such a manner that a distal end 151 thereof is not in contact with the surface of the rotating shaft F.

In the current embodiment, as shown in FIG. 5, the separation preventer 15 does not protrude beyond the surface of a first top foil 50 directly facing an outer circumferential surface of the rotating shaft F.

In the current embodiment, as shown in FIG. 5, the distal end 151 of the separation preventer 15 is not provided in a linear shape but is provided in a circular shape having the centerline C as a center of circle.

In the current embodiment, the separation preventer 15 is formed by forming a substantially rectangular protrusion in a pressing process for forming the base foil body 11, and then bending the protrusion by 90°.

As shown in FIG. 2, the bump foil 20 is a circular pipe member produced by pressing a flexible and elastic metal plate, and includes a bump foil body 21, an insertion portion 22, coupling holes 23, and an assembly direction identification recess 24.

The bump foil body 21 is a circular pipe member extending a preset length along the centerline C, and includes a hollow H having the centerline C as a center of circle.

In the current embodiment, the bump foil body 21 is formed as a pipe with a "C"-shaped cross-section by rolling a rectangular pressed metal plate around the centerline C.

The bump foil body 21 is disposed to surround the top foils 30, 40, and 50 while being accommodated in the hollow H of the base foil 10.

The bump foil body 21 includes a wave-shaped portion in which a plurality of peaks and valleys are alternately connected, so as to be elastically deformable in a radial direction of the centerline C.

As shown in FIGS. 2 and 4, the insertion portion 22 is a portion provided at a right end of the bump foil body 21 and, in the current embodiment, the right end of the bump foil body 21 is bent in an "L" shape and protrudes upward so as to be accommodated in the accommodation portion 13 described below.

Hereinafter, a portion where the insertion portion 22 of the bump foil 20 and the insertion portions 32, 42, and 52 of the top foils 30, 40, and 50 described below are provided is referred to as a "root".

As shown in FIG. 2, the coupling holes 23 are four holes spaced apart from each other by a preset distance along the centerline C, and are formed in the insertion portion 22.

As shown in FIG. 1, the assembly direction identification recess 24 is an "L"-shaped recess formed at a front end of the bump foil 20 to prevent a user's mistake when assembling or mounting the bearing.

The assembly direction identification recess 24 is formed at a position corresponding to and in the same shape as the assembly direction identification recess 14.

As shown in FIG. 2, a left end of the bump foil body 21 is a free end that may move freely.

In the current embodiment, as shown in FIG. 4, two bump foils 20 are provided to overlap each other.

As shown in FIG. 2, the top foils 30, 40, and 50 are circular pipe members produced by pressing flexible and elastic metal plates, and are positioned to face the outer circumferential surface of the rotating shaft F.

In the current embodiment, the top foils 30, 40, and 50 include a third top foil 30, a second top foil 40, and a first top foil 50.

As shown in FIG. 2, the third top foil 30 is a circular pipe member produced by pressing a flexible and elastic metal plate, is disposed to face an outer circumferential surface of the second top foil 40, and includes a top foil body 31, an insertion portion 32, coupling holes 33, and an assembly direction identification recess 34.

The base foil 10, the bump foil 20, and the top foils 30, 40, and 50 may be produced using metal plates of the same material, and have different thicknesses.

The top foil body 31 is a circular pipe member extending a preset length along the centerline C, and includes a hollow H having the centerline C as a center of circle.

In the current embodiment, the top foil body 31 is formed as a pipe with a "C"-shaped cross-section by rolling a rectangular pressed metal plate around the centerline C.

The top foil body 31 is disposed to surround the second top foil 40 while being accommodated in the hollow H of the bump foil 20.

As shown in FIG. 4, the insertion portion 32 is a portion provided at a left end of the top foil body 31 and, in the current embodiment, the left end of the top foil body 31 is bent in an "L" shape and protrudes upward so as to be accommodated in the accommodation portion 13 described below.

As shown in FIG. 2, the coupling holes 33 are four holes spaced apart from each other by a preset distance along the centerline C, and are formed in the insertion portion 32.

As shown in FIG. 1, the assembly direction identification recess 34 is an "L"-shaped recess formed at a front end of the third top foil 30 to prevent a user's mistake when assembling or mounting the bearing.

The assembly direction identification recess 34 is formed at a position corresponding to and in the same shape as the assembly direction identification recesses 14 and 24.

As shown in FIG. 2, a right end of the top foil body 31 is a free end that may move freely.

As shown in FIG. 2, the second top foil 40 is a circular pipe member produced by pressing a flexible and elastic metal plate, and is disposed between the first top foil 50 and the third top foil 30.

The second top foil 40 includes a top foil body 41, an insertion portion 42, coupling holes 43, an assembly direction identification recess 44, and a separation preventer coupling hole 45.

The second top foil 40 is mostly the same as or corresponds to the above-described third top foil 30 and thus only the differences between the two will be described below.

As shown in FIG. 2, in the second top foil 40, the insertion portion 42 is provided at a right end of the top foil body 41.

Unlike the third top foil 30, in the second top foil 40, because the top foil body 41 has a relatively short length, a free end is positioned substantially opposite the insertion portion 42.

As shown in FIG. 2, the first top foil 50 is a circular pipe member produced by pressing a flexible and elastic metal plate, and is disposed between the rotating shaft F and the second top foil 40 to directly face the outer circumferential surface of the rotating shaft F.

The first top foil 50 includes a top foil body 51, an insertion portion 52, coupling holes 53, an assembly direction identification recess 54, and a separation preventer 55.

The first top foil 50 is coated with a coating material (not shown) including polytetrafluoroethylene (PTFE) on a surface facing the outer circumferential surface of the rotating shaft F. PTFE is also called Teflon.

The first top foil 50 is mostly the same as or corresponds to the above-described third top foil 30 and thus only the differences between the two will be described below.

The separation preventer 55 is a stopper for restraining the first top foil 50 from being separated along the longitudinal direction C of the rotating shaft F, and at least one separation preventer 55 is provided on the first top foil 50.

As shown in FIG. 2, the separation preventer 55 is provided at each of both ends of a hollow H of the first top foil 50.

In the current embodiment, one separation preventer 55 is provided at each of both ends of the hollow H of the first top foil 50.

In the current embodiment, as shown in FIG. 2, the separation preventer 55 is provided at each of both sides of a distal end of a free end of the top foil body 51 to maximize the separation prevention effect.

In the current embodiment, as shown in FIG. 4, the separation preventer 55 protrudes a preset length H2 toward the second top foil 40, and has a structure which does not move in the longitudinal direction C of the rotating shaft F by being restrained at a side of the root of the second top foil 40.

In the current embodiment, the separation preventer 55 is formed by forming a substantially rectangular protrusion in a pressing process for forming the top foil body 51, and then bending the protrusion by 90°.

In the current embodiment, as shown in FIG. 4, the separation preventer 55 does not protrude beyond the outer circumferential surface of the base foil 10, and has a position and shape not in contact with the base foil 10 and the bump foil 20.

Herein, a distance in the longitudinal direction C between the pair of separation preventers 55 has the same value as a width of the second top foil 40 within a preset tolerance.

The coupling means is a means for coupling the insertion portions 32, 42, and 52 of the top foils 30, 40, and 50, the insertion portion 22 of the bump foil 20, and the insertion portion 12 of the base foil 10, which are accommodated in the accommodation portion 13 of the base foil 10, to the accommodation portion 13 of the base foil 10.

In the current embodiment, the coupling means includes the coupling holes 121, 133, 23, 33, 43, and 53 and a coupling member 60.

The coupling holes 121, 133, 23, 33, 43, and 53 are already described above and thus a description thereof is not provided herein.

Figure 15:
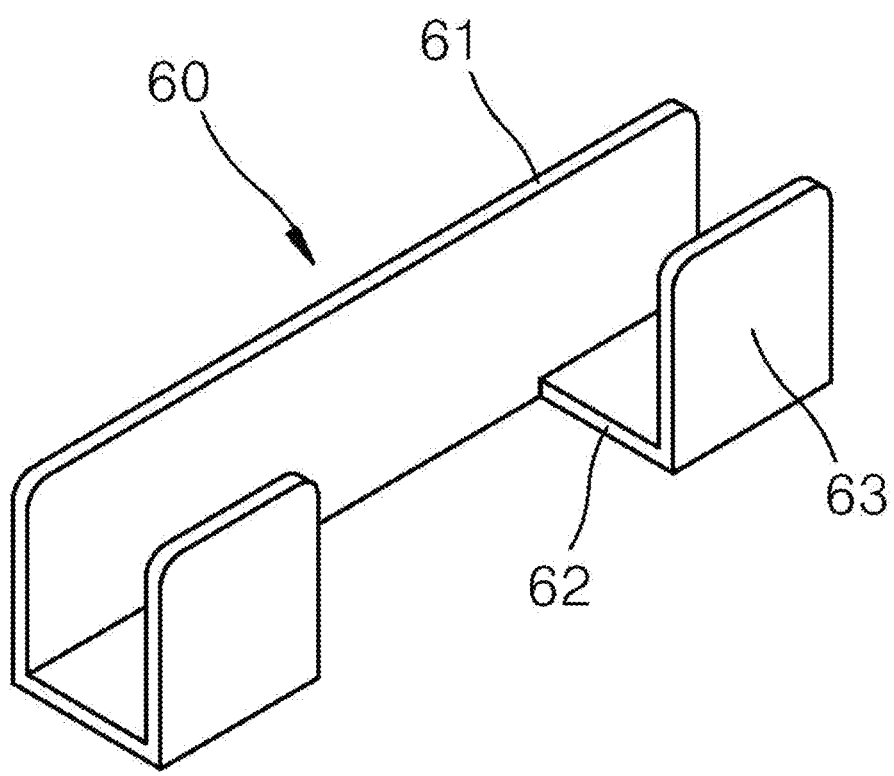
FIG. 15 is a view showing a coupling member illustrated in FIG. 2.

As shown in FIG. 15, the coupling member 60 is a "U"-shaped plate member inserted into the coupling holes 121, 133, 23, 33, 43, and 53 to fix the top foils 30, 40, and 50, the bump foil 20, and the base foil 10 to each other. The coupling member 60 includes a body portion 61, penetrating portions 62, and bent portions 63.

The body portion 61 is a long strip-shaped portion and is disposed on an outer surface of the vertical portion 132 along the centerline C.

The penetrating portions 62 are portions inserted into the coupling holes 121, 133, 23, 33, 43, and 53, and are disposed at both ends of the body portion 61.

In the current embodiment, the penetrating portions 62 are horizontal portions bent in an "L" shape from the body portion 61.

The bent portions 63 are vertical portions formed when distal ends of the penetrating portions 62 inserted into a pair of coupling holes 133 as shown in FIG. 4 are bent upward and plastic-deformed as shown in FIGS. 4 and 15.

The bent portions 63 are in close contact with an outer surface of the vertical portion 132 such that the coupling member 60 is firmly coupled without being separated from the accommodation portion 13.

In short, the penetrating portions 62 which originally have a "-" shape are sufficiently inserted in such a manner that the body portion 61 is in close contact with the outer surface of one vertical portion 132, and then protruding distal ends of the penetrating portions 62 are bent upward and plastic-deformed to form the bent portions 63.

In the current embodiment, the top foils 30, 40, and 50, the bump foil 20, and the base foil 10 have a shape which is mass-producible by being automatically cut and bent through pressing without using a welding process.

Figure 9:
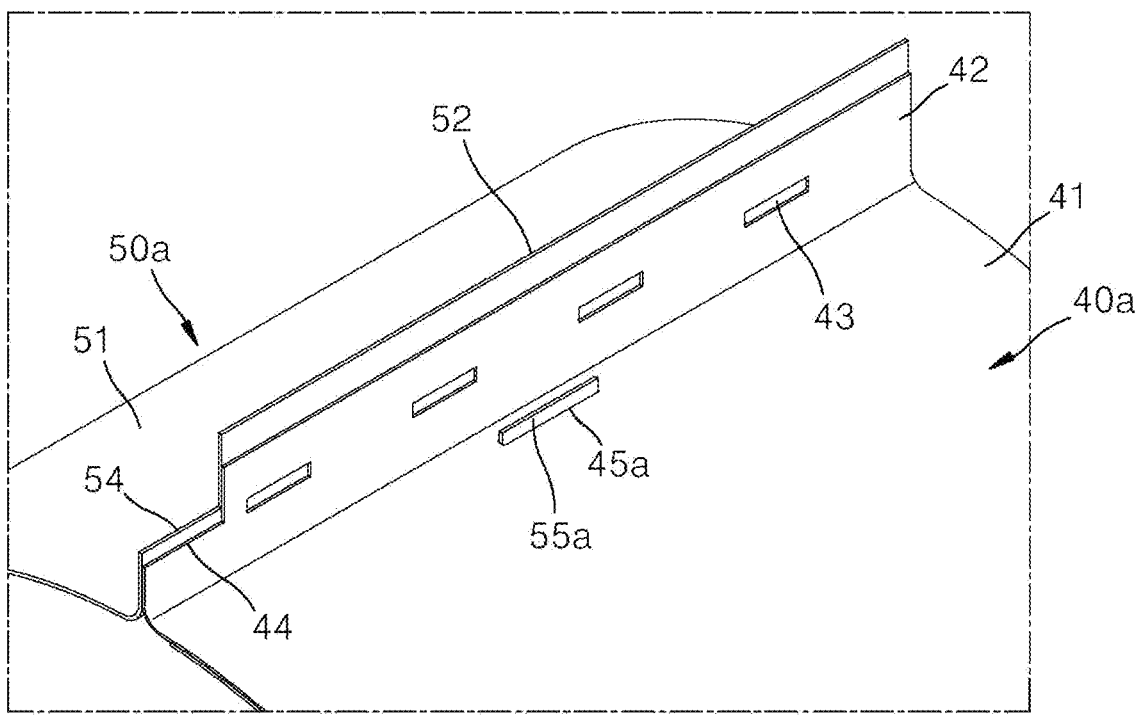
FIG. 9 is a view showing a state in which a second top foil and first top foil according to a second embodiment of the present invention are coupled to each other.

Meanwhile, FIG. 9 shows a coupling structure between a second top foil 40a and a first top foil 50a according to a second embodiment of the present invention.

Figure 10:
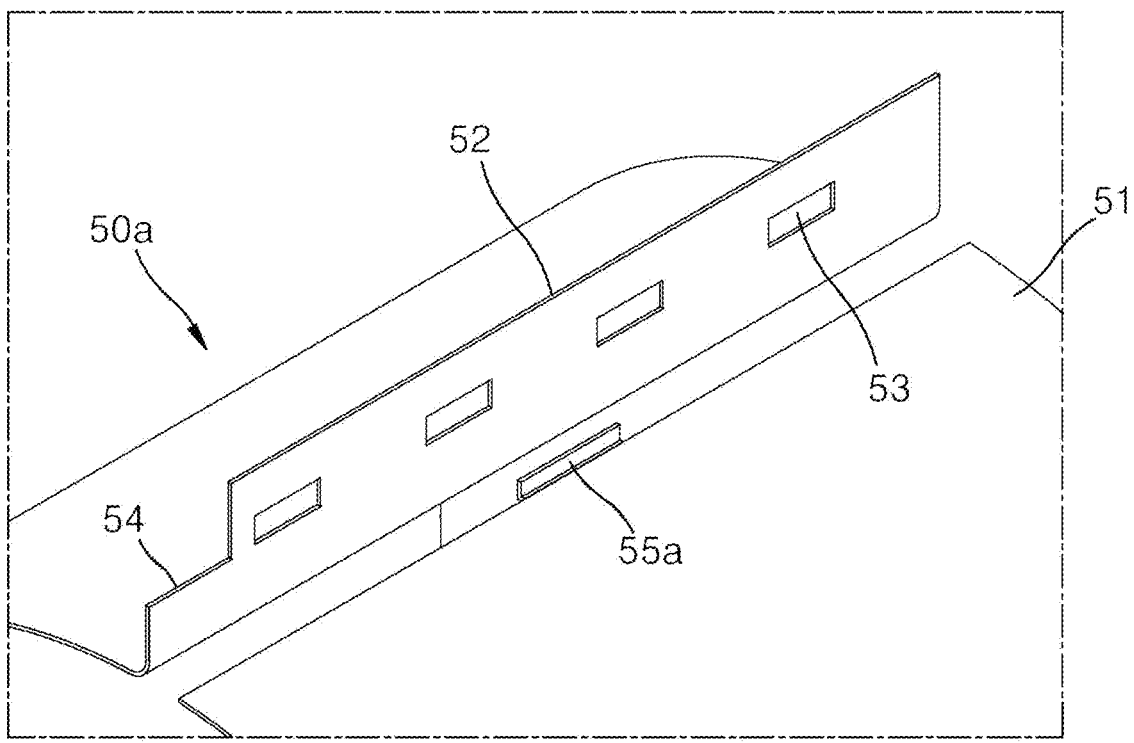
FIG. 10 is a partially enlarged view of the first top foil illustrated in FIG. 9.

As shown in FIG. 10, a separation preventer 55a is provided in the middle of a distal end of a free end of the first top foil 50a.

The separation preventer 55a of the first top foil 50a extends along the longitudinal direction of the rotating shaft F, and is provided at the front of a distal end of the free end of the first top foil 50a.

Herein, the separation preventer 55a is also formed by forming a substantially rectangular protrusion in a pressing process for forming the top foil body 51, and then bending the protrusion by 90°.

Figure 11:
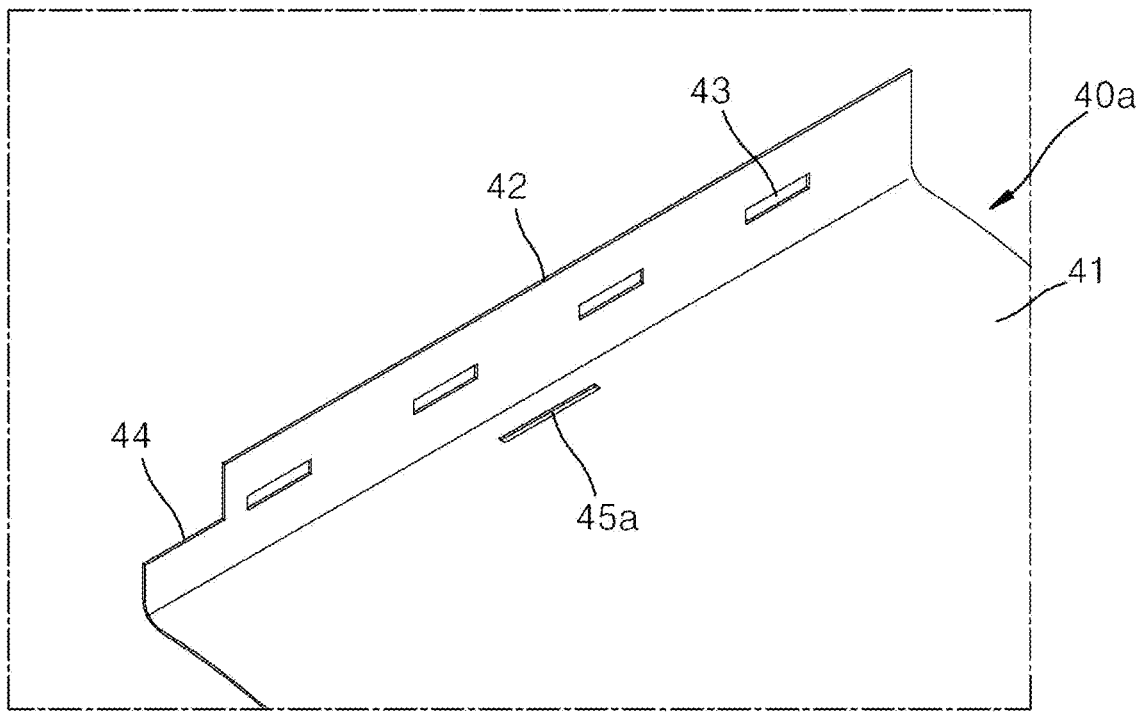
FIG. 11 is a partially enlarged view of the second top foil illustrated in FIG. 9.

As shown in FIG. 11, a separation preventer coupling hole 45a to be detachably coupled to the separation preventer 55a is provided near a root of the second top foil 40a to have a position and shape corresponding to the separation preventer 55a.

Figure 12:
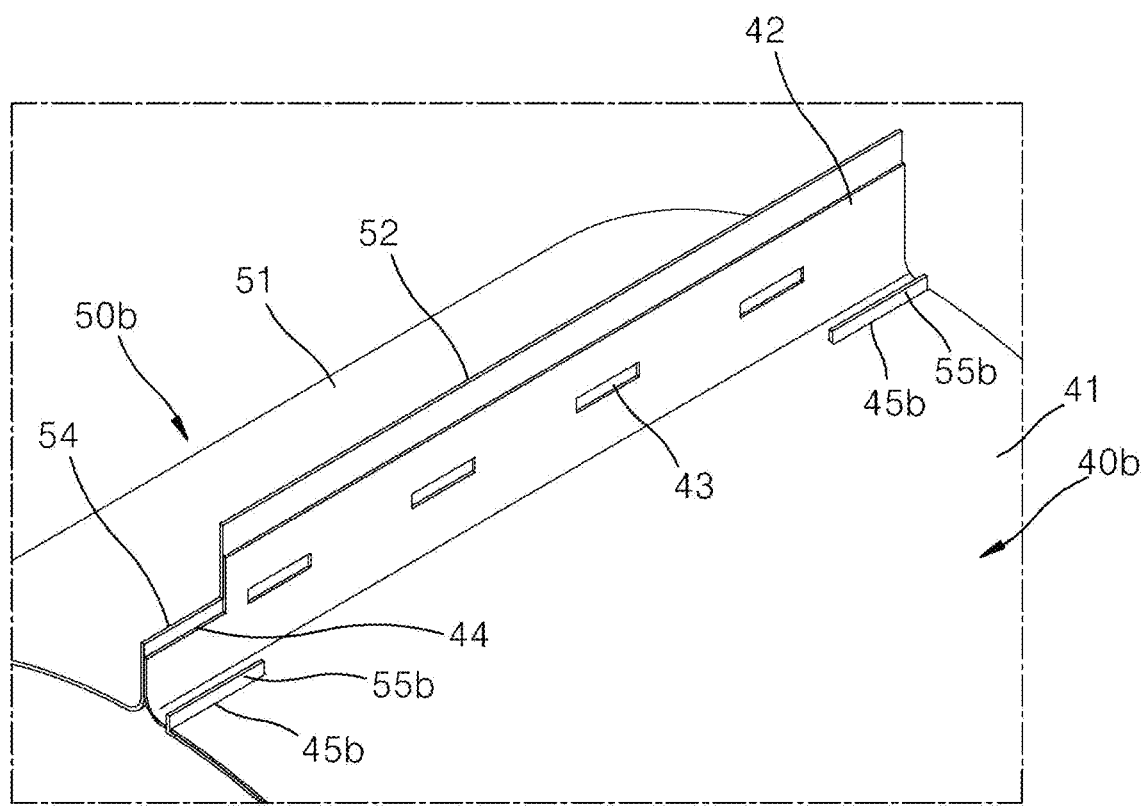
FIG. 12 is a view showing a state in which a second top foil and first top foil according to a third embodiment of the present invention are coupled to each other.

Meanwhile, FIG. 12 shows a coupling structure between a second top foil 40b and a first top foil 50b according to a third embodiment of the present invention.

Figure 13:
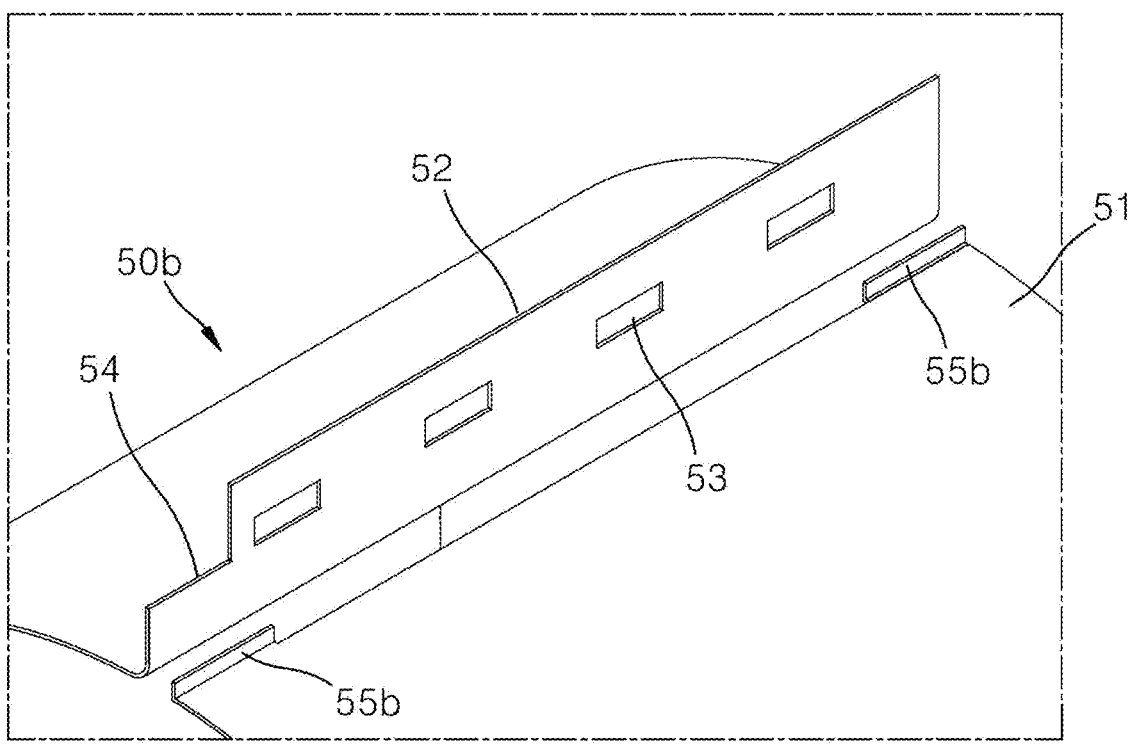
FIG. 13 is a partially enlarged view of the first top foil illustrated in FIG. 12.

As shown in FIG. 13, a pair of separation preventers 55b are provided at the front of a distal end of a free end of the first top foil 50b.

The separation preventers 55b are disposed at both ends of the hollow H of the first top foil 50b so as to be spaced as far apart from each other as possible.

Figure 14:
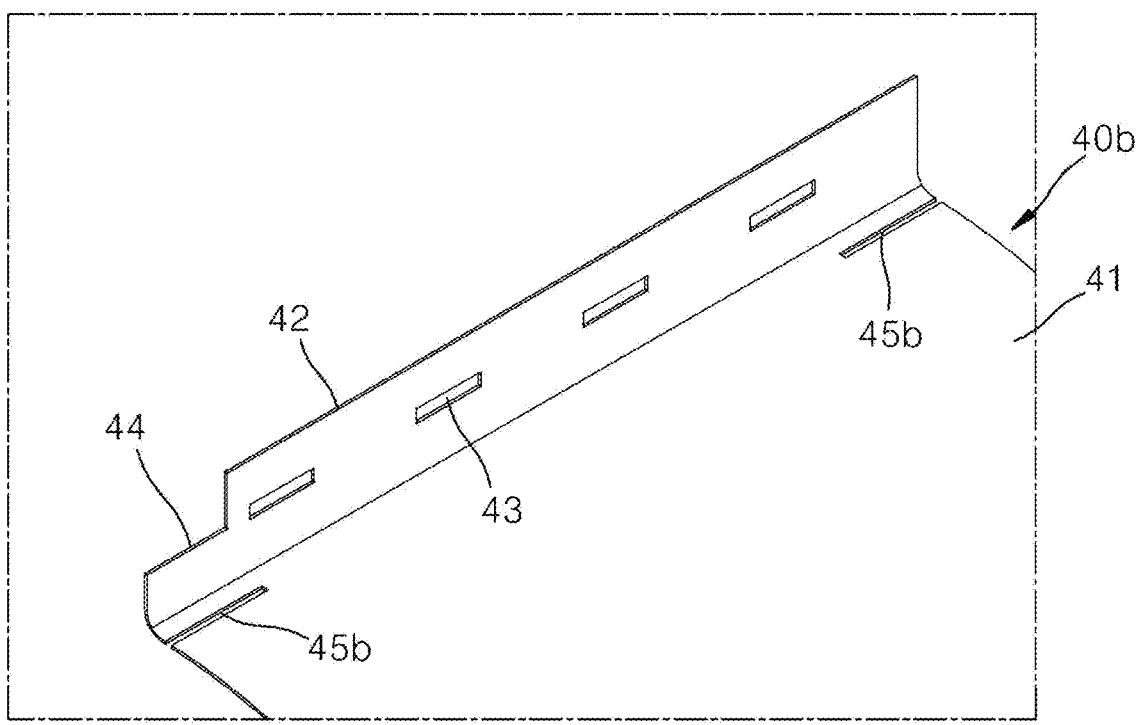
FIG. 14 is a partially enlarged view of the second top foil illustrated in FIG. 12.

As shown in FIG. 14, separation preventer coupling holes 45b to be detachably coupled to the separation preventers 55b are provided to have positions and shapes corresponding to the separation preventers 55b.

In the current embodiment, the separation preventer coupling holes 45b have a "U" shape with an open outer end.

An example of a method of assembling and mounting the above-described journal foil air bearing 100 will now be described.

Initially, while the coupling member 60 is not mounted, the base foil 10, the bump foil 20, and the top foils 30, 40, and 50 are assembled as shown in FIG. 2. In this case, as shown in FIGS. 16 and 4, the first top foil 50 is disposed to face the outer circumferential surface of the rotating shaft F, the second top foil 40 is disposed to surround the first top foil 50, the third top foil 30 is disposed to surround the second top foil 40, the two bump foils 20 are disposed to surround the third top foil 30, and the base foil 10 is disposed to surround the two bump foils 20.

When the base foil 10, the bump foil 20, and the top foils 30, 40, and 50 are assembled as shown in FIG. 3, the coupling holes 121, 133, 23, 33, 43, and 53 are aligned in a row as shown in FIG. 4.

Subsequently, as shown in FIG. 15, when the coupling member 60 is inserted into the coupling holes 133 and the bent portions 63 are formed by bending distal ends thereof, the coupling member 60 is firmly coupled without being separated from the accommodation portion 13 and thus the journal foil air bearing 100 is completely assembled.

Herein, as shown in FIG. 5, the separation preventer 15 restrains both sides of the bump foil 20 accommodated in the hollow H of the base foil 10, from being separated in both directions along the longitudinal direction C of the rotating shaft F.

In addition, as shown in FIG. 4, the distal end of the free end of the first top foil 50 is restrained by the separation preventer 55 from being separated in both directions along the longitudinal direction of the rotating shaft F.

Lastly, as shown in FIG. 16, when the journal foil air bearing 100 "modularized" as described above is inserted into the bearing housing S including the housing groove P at the top of the inner circumferential surface thereof, the journal foil air bearing 100 is completely mounted. In this case, a user accurately identifies a position and direction of mounting the bearing by using the assembly direction identification recesses 14, 24, 34, 44, and 54 and pushes in the journal foil air bearing 100 along the centerline C, thereby simply mounting the journal foil air bearing 100 in the bearing housing S. Herein, the accommodation portion 13 is accommodated in the housing groove P.

The above-described journal foil air bearing 100 is a journal foil air bearing for supporting a load applied along the radial direction of the rotating shaft F rotating about the centerline C, and includes the top foils 30, 40, and 50 disposed to face the outer circumferential surface of the rotating shaft F and surround the rotating shaft F; the bump foil 20 provided as an elastically deformable member and disposed to surround the top foils 30, 40, and 50; the base foil 10 disposed to surround the bump foil 20, provided as a circular pipe member extending a preset length along the centerline C, and including the hollow H having the centerline C as a center of circle; and at least one separation preventer 15 provided on the base foil 10 to restrain the bump foil 20 accommodated in the hollow H of the base foil 10, from being separated along the longitudinal direction C of the rotating shaft F, wherein the separation preventer 15 protrudes the preset length H1 toward the rotating shaft F in such a manner that the distal end thereof is not in contact with the surface of the rotating shaft F. As such, because the bump foil 20 does not escape in the longitudinal direction C of the rotating shaft F during operation, the performance of the bearing may not be reduced and serious secondary damage due to the contact between the escaped bump foil 20 and other components may not be caused.

According to the journal foil air bearing 100, because the distal end 151 of the separation preventer 15 is provided in a circular shape having the centerline C as a center of circle, the possibility that the separation preventer 15 comes into contact with the top foils 30, 40, and 50 or the rotating shaft F may be low.

According to the journal foil air bearing 100, because the base foil 10 is formed as a pipe with a "C"-shaped cross-section by rolling a rectangular pressed metal plate around the centerline C and the separation preventer 15 is formed by bending a protrusion pressed in a preset shape and protruding from the metal plate, the base foil 10 with the separation preventer 15 may be mass-produced through pressing without using a welding process.

According to the journal foil air bearing 100, because the separation preventer 15 is provided at each of both ends of the hollow H of the base foil 10, the bump foil 20 accommodated in the hollow H of the base foil 10 may not be separated in both directions along the longitudinal direction C of the rotating shaft F.

According to the journal foil air bearing 100, because a plurality of separation preventers 15 are provided and spaced apart from each other by a preset distance along the circumferential direction of the base foil 10, the separation preventers 15 may uniformly restrain the whole side of the bump foil 20.

According to the journal foil air bearing 100, because the separation preventer 15 protrudes the preset length toward the rotating shaft F and does not protrude beyond the surface of the first top foil 50 facing the outer circumferential surface of the rotating shaft F, noise or damage to the rotating shaft F by the separation preventer 15 may not occur.

According to the journal foil air bearing 100, because the journal foil air bearing 100 further includes the coupling means for coupling the ends of the top foils 30, 40, and 50, the end of the bump foil 20, the end of the base foil 10, and the other end of the base foil 10 to each other, the journal foil air bearing 100 may be easily pre-assembled and modularized into a single piece, and thus may be easily mounted in or removed from the bearing housing S at a work site and easily stored and managed.

According to the journal foil air bearing 100, because at least one of the top foils 30, 40, and 50, the bump foil 20, and the base foil 10 has a shape which is mass-producible through pressing, the journal foil air bearing 100 may be appropriate for mass production compared to a case in which a welding method or the like is used.

Figure 17:
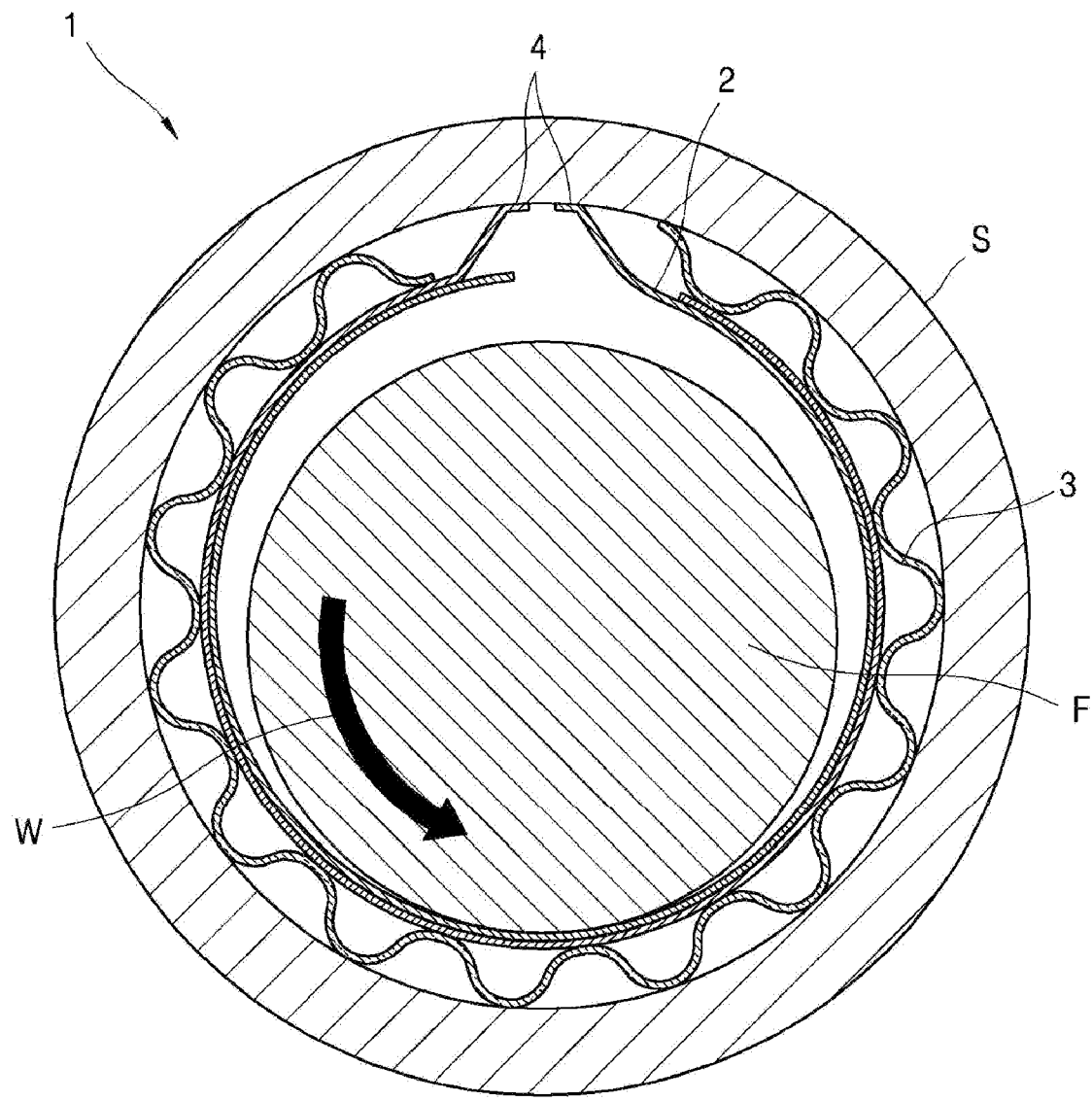
FIG. 17 is a cross-sectional view of an existing journal foil air bearing.

According to the journal foil air bearing 100, because the base foil 10 serves to maintain the exterior of and support the bump foil 20 and the top foils 30, 40, and 50, and an inner circumferential surface of the base foil 10 is provided as a smooth thin plate to maintain superior shape tolerance and surface friction compared to the inner circumferential surface of the bearing housing S, compared to the existing journal foil air bearing 1 in which the inner circumferential surface of the bearing housing S is in direct contact with the bump foil 3 as shown in FIG. 17, even when the inner surface of the bearing housing S is poorly processed, the bearing may be easily mounted and the performance of the bearing may be hardly affected.

According to the journal foil air bearing 100, because the accommodation portion 13 includes the accommodation space 134 formed by bending an end of the base foil 10 in a "∩" shape, the base foil 10 may be mass-produced through pressing without using a welding process.

According to the journal foil air bearing 100, because the ends of the top foils 30, 40, and 50, the end of the bump foil 20, and the other end of the base foil 10 are bent in an "L" shape to form the insertion portions 12, 22, 32, 42, and 52 to be accommodated in the accommodation portion 13, the insertion portions 12, 22, 32, 42, and 52 may be mass-produced through pressing without using a welding process, and easily accommodated in the accommodation portion 13.

According to the journal foil air bearing 100, because the accommodation portion 13 protrudes in a radial direction from the outer circumferential surface of the base foil 10, the journal foil air bearing 100 may be mounted in the bearing housing S with an accurate direction and depth by inserting the accommodation portion 13 into the housing groove P formed in the bearing housing S.

The journal foil air bearing 100 is a journal foil air bearing for supporting a load applied along the radial direction of the rotating shaft F rotating about the centerline C, and includes the first top foil 50 disposed to face the outer circumferential surface of the rotating shaft F and surround the rotating shaft F; the second top foil 40 disposed to surround the first top foil 50; the bump foil 20 provided as an elastically deformable member and disposed to surround the second top foil 40; the base foil 10 disposed to surround the bump foil 20; and at least one separation preventer 55 provided on the first top foil 50 to restrain the first top foil 50 from being separated along the longitudinal direction C of the rotating shaft F, wherein the separation preventer 55 protrudes the preset length H2 toward the second top foil 40 and is restrained by the second top foil 40 from moving in the longitudinal direction of the rotating shaft F. As such, because the first top foil 50 does not escape in the longitudinal direction C of the rotating shaft F during operation, the performance of the bearing may not be reduced and serious secondary damage due to the contact between the escaped first top foil 50 and other components may not be caused.

According to the journal foil air bearing 100, because the first top foil 50 is formed as a pipe with a "C"-shaped cross-section by rolling a rectangular pressed metal plate around the centerline C, and the separation preventer 55 is formed by bending a protrusion pressed in a preset shape and protruding from the metal plate, the first top foil 50 with the separation preventer 55 may be mass-produced through pressing without using a welding process.

According to the journal foil air bearing 100, because the separation preventer 55 is provided at each of both ends of the hollow H of the first top foil 50, the distal end of the free end of the first top foil 50 may not be separated in both directions along the longitudinal direction C of the rotating shaft F.

According to the journal foil air bearing 100, because the separation preventer 55 protrudes the preset length H2 toward the second top foil 40 and does not protrude beyond the outer circumferential surface of the base foil 10, the separation preventer 55 may not be in contact with the base foil 10 or the bearing housing S during operation of the bearing.

According to the journal foil air bearing 100, because the separation preventer 55 is not in contact with the base foil 10 and the bump foil 20, noise or damage to the base foil 10 and the bump foil 20 by the separation preventer 55 may not occur during operation of the bearing.

According to the journal foil air bearing 100, because the journal foil air bearing 100 further includes the separation preventer coupling hole 45a or 45b provided in the second top foil 40a or 40b so as to be detachably coupled to the separation preventer 55a or 55b, the separation preventer 55a or 55b may be provided at a position other than both sides of the distal end of the first top foil 50.

According to the journal foil air bearing 100, because the separation preventer coupling hole 45a is provided in the middle of the end of the second top foil 40a as shown in FIG. 9, the distal end of the first top foil 50 may be restrained in both directions by using only one separation preventer 55a.

According to the journal foil air bearing 100, because the separation preventer coupling hole 45b is provided at each of both ends of the hollow H of the second top foil 40, and has an open side, the distal end of the first top foil 50 and the root of the second top foil 40 may be more firmly coupled compared to a case when only one separation preventer 55a is used.

Although one separation preventer 55 is provided at each of both ends of the hollow H at the distal end of the first top foil 50 in the current embodiment, a plurality of separation preventers 55 may be provided at each of both ends of the hollow H of the first top foil 50 and spaced apart from each other by a preset distance along a circumferential direction of the first top foil 50.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A journal foil air bearing for supporting a load applied along a radial direction of a rotating shaft rotating about a centerline, the journal foil air bearing comprising:
   a top foil disposed to face an outer circumferential surface of the rotating shaft and surround the rotating shaft;
   a bump foil provided as an elastically deformable member and disposed to surround the top foil;
   a base foil disposed to surround the bump foil, the base foil forming a circular pipe member comprising a preset length along the centerline of the rotating shaft and a hollow, the hollow defining a circular shape with the center of the circular shape aligning with the centerline of the rotating shaft; and at least one separation preventer provided on the base foil to restrain the bump foil accommodated in the hollow of the base foil and prevent separation along a longitudinal direction of the rotating shaft, wherein the separation preventer protrudes a preset height toward the rotating shaft in such a manner that a distal end of the separation preventer is not in contact with a surface of the rotating shaft, wherein the base foil is formed by rolling a pressed rectangular metal plate around the centerline into a pipe having a "C"-shaped cross-section, wherein the pressed metal plate includes a protruding portion that extends in the longitudinal direction of the rotating shaft from at least one end of the base foil and the separation preventor is formed by bending the protruding portion at a right angle toward the rotating shaft, wherein the separation preventer has a preset width along a circumferential direction of the base foil and the preset height toward the rotating shaft, wherein the distal end of the separation preventer is formed in a circular shape having the centerline of the rotating shaft as a center of the circular shape, and wherein a coupling means is provided for coupling an end of the top foil, an end of the bump foil, one end of the base foil, and an opposite end of the base foil together.

2. The journal foil air bearing of claim 1, wherein the separation preventer is provided at each of both ends of the base foil.

3. The journal foil air bearing of claim 1, wherein a plurality of separation preventers are provided and spaced apart from each other by a preset distance along the circumferential direction of the base foil.

4. The journal foil air bearing of claim 1, wherein the height of the separation preventer does not protrude beyond a surface of the top foil facing the outer circumferential surface of the rotating shaft.

* * * * *